Patented June 17, 1930

1,764,571

UNITED STATES PATENT OFFICE

ARTHUR R. LYTLE, OF ELMHURST, NEW YORK, ASSIGNOR TO U. C. & C. RESEARCH LABS. INC., A CORPORATION OF NEW YORK

BRAZING ROD

No Drawing.     Application filed September 7, 1928.  Serial No. 304,622.

My invention relates to brazing alloys and has for an object the production of a relatively low melting point brazing rod which may be rolled into rod form.

Difficulty has been encountered in the brazing of articles made of the phosphor bronzes, and the brass alloys such as Muntz metal, because of the lack of a strong, inexpensive brazing metal having a suitable melting point. My invention provides an alloy of copper and zinc in the proportions in which they are present in the brasses commercially designated as the 70–30 type together with other materials, the complete alloy having a sufficiently low melting point to be usable for the brazing of bronze and the harder brasses, and being of good strength, ductile enough to be drawn into rod or wire form for use under the torch, inexpensive, and broadly adaptable to substantially all of the uses to which the previously known silver solder has been put.

In practicing my invention I may conveniently provide an alloy having substantially the following limits as to chemical composition:

| | |
|---|---|
| Copper | 68%–73% |
| Zinc | 30.75–23.50 |
| Phosphorus | 1.25– 2.50 |
| Tin | 0– 1.00 |

This alloy has a melting point of about 1450° F. which I find to be sufficiently below the melting point of the common brass alloys to permit the use of it under the torch as a brazing material.

It flows readily and requires relatively little flux. In fact, if the surfaces to be brazed are clean, a flux may be dispensed with entirely. This effect seems to be due to the cleaning and deoxidizing action of the phosphorus. The alloy is sufficiently ductile to be rolled in the cold into rods suitable for welding and brazing purposes.

The presence of various quantities of other materials is not found to be injurious. Iron may be present to the extent of 1% or 2% without affecting the properties injuriously, and silicon may be present in amounts up to about 0.25%. Various quantities of tin may also be added as indicated above, the presence of the tin increasing the fluidity of the material and still further lowering the melting point. The tin may, however, be entirely omitted without injury to the alloy.

While I have shown but a limited range of embodiments of the alloy of my invention it is capable of still further modifications therefrom without departure from the spirit thereof and it is desired therefore that only such limitations shall be imposed upon the appended claims as are stated therein or required by the prior art.

I claim as my invention:

1. A brazing rod comprising a brass alloy of the 70–30 copper-zinc type containing about 1.25% to 2.50% phosphorus.

2. A brazing rod comprising an alloy containing copper over a range of 68% to 73%, zinc over a range of 30.75% to 23.50%, a substantial amount of tin but not more than 1%, and phosphorus 1.25% to 2.50%.

3. A brazing rod consisting of an alloy containing approximately, copper between 68% and 70%, zinc between 23.50% and 30.75%, and phosphorus between 1.25% to 2.50%, said alloy being substantialy free from additions other than those herein indicated to be non-deleterious.

In testimony whereof, I affix my signature.

ARTHUR R. LYTLE.